(12) United States Patent
Morat

(10) Patent No.: US 9,934,758 B1
(45) Date of Patent: Apr. 3, 2018

(54) SYSTEMS AND METHODS FOR SIMULATING ADAPTATION OF EYES TO CHANGES IN LIGHTING CONDITIONS

(71) Applicant: GOPRO, INC., San Mateo, CA (US)

(72) Inventor: Julien Morat, Lancey (FR)

(73) Assignee: GoPro, Inc., San Mateo, CA (US)

( * ) Notice: Subject to any disclaimer, the term of this patent is extended or adjusted under 35 U.S.C. 154(b) by 45 days.

(21) Appl. No.: 15/271,931

(22) Filed: Sep. 21, 2016

(51) Int. Cl.
*G09G 5/00* (2006.01)
*G09G 5/10* (2006.01)

(52) U.S. Cl.
CPC .......... *G09G 5/10* (2013.01); *G09G 2320/064* (2013.01); *G09G 2354/00* (2013.01); *G09G 2360/144* (2013.01)

(58) Field of Classification Search
CPC ................. G09G 5/10; G09G 2354/00; G09G 2360/144; G09G 2320/064
See application file for complete search history.

(56) References Cited

U.S. PATENT DOCUMENTS

| | | |
|---|---|---|
| 5,260,779 A | 11/1993 | Wasserman |
| 5,555,895 A | 9/1996 | Ulmer |
| 6,434,265 B1 | 8/2002 | Xiong |
| 6,486,908 B1 | 11/2002 | Chen |
| 6,710,740 B2 | 3/2004 | Needham |
| 6,711,293 B1 | 3/2004 | Lowe |
| 6,788,333 B1 | 9/2004 | Uyttendaele |
| 7,057,663 B1 | 6/2006 | Lee |
| 7,403,224 B2 | 7/2008 | Fuller |
| 7,983,502 B2 | 7/2011 | Cohen |
| 8,411,166 B2 | 4/2013 | Miyata |
| 8,606,073 B2 | 12/2013 | Woodman |
| 8,670,030 B2 | 3/2014 | Tanaka |

(Continued)

FOREIGN PATENT DOCUMENTS

| | | |
|---|---|---|
| EP | 0605045 A1 | 7/1994 |
| EP | 0650299 A1 | 4/1995 |

(Continued)

OTHER PUBLICATIONS

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

(Continued)

*Primary Examiner* — Muhammad N Edun
(74) *Attorney, Agent, or Firm* — Sheppard Mullin Richter & Hampton LLP

(57) ABSTRACT

Capture of visual content by image sensor(s) may define a luminance of the visual content. A viewing field of view may define an extent of the visual content presented on a display. The luminance may vary as a function of a viewing field of view. A user may change the viewing field of view from a first viewing field of view to a second viewing field. A first luminance of the visual content within the first viewing field of view and a second luminance of the visual content within the second viewing field of view may be determined. A lighting effect may be applied to the visual content based on a difference between the first luminance and the second luminance.

20 Claims, 8 Drawing Sheets

(56) References Cited

U.S. PATENT DOCUMENTS

| | | |
|---|---|---|
| 8,842,197 B2 | 9/2014 | Singh |
| 8,890,954 B2 | 11/2014 | O'Donnell |
| 8,896,694 B2 | 11/2014 | O'Donnell |
| 9,019,396 B2 | 4/2015 | Kiyoshige |
| 9,158,304 B2 | 10/2015 | Fleck |
| 9,342,534 B2 | 5/2016 | Singh |
| 9,409,646 B2 | 8/2016 | Fleck |
| 9,473,758 B1 | 10/2016 | Long |
| 9,602,795 B1 | 3/2017 | Matias |
| 2002/0112005 A1 | 8/2002 | Namias |
| 2002/0122113 A1 | 9/2002 | Foote |
| 2002/0191087 A1 | 12/2002 | Hashimoto |
| 2003/0085992 A1 | 5/2003 | Arpa |
| 2003/0098954 A1 | 5/2003 | Amir |
| 2003/0160862 A1 | 8/2003 | Charlier |
| 2004/0010804 A1 | 1/2004 | Hendricks |
| 2004/0021780 A1 | 2/2004 | Kogan |
| 2004/0047606 A1 | 3/2004 | Mikawa |
| 2004/0075738 A1 | 4/2004 | Burke |
| 2004/0135900 A1 | 7/2004 | Pyle |
| 2004/0169724 A1 | 9/2004 | Ekpar |
| 2005/0033760 A1 | 2/2005 | Fuller |
| 2005/0062869 A1 | 3/2005 | Zimmermann |
| 2005/0104976 A1 | 5/2005 | Currans |
| 2005/0134707 A1 | 6/2005 | Perotti |
| 2005/0289111 A1 | 12/2005 | Tribble |
| 2006/0050997 A1 | 3/2006 | Imamura |
| 2007/0030358 A1 | 2/2007 | Aoyama |
| 2007/0053659 A1 | 3/2007 | Kiyama |
| 2007/0120986 A1 | 5/2007 | Nunomaki |
| 2007/0140662 A1 | 6/2007 | Nunomaki |
| 2007/0300249 A1 | 12/2007 | Smith |
| 2008/0094499 A1 | 4/2008 | Ueno |
| 2008/0118100 A1 | 5/2008 | Hayashi |
| 2009/0210707 A1 | 8/2009 | De Lutiis |
| 2009/0251558 A1 | 10/2009 | Park |
| 2009/0262206 A1 | 10/2009 | Park |
| 2009/0271447 A1 | 10/2009 | Shin |
| 2010/0045773 A1 | 2/2010 | Ritchey |
| 2010/0097443 A1 | 4/2010 | Lablans |
| 2010/0238304 A1 | 9/2010 | Miyata |
| 2010/0250022 A1 | 9/2010 | Hines |
| 2010/0289924 A1 | 11/2010 | Koshikawa |
| 2010/0299630 A1 | 11/2010 | McCutchen |
| 2011/0013778 A1 | 1/2011 | Takumai |
| 2011/0115883 A1 | 5/2011 | Kellerman |
| 2011/0141300 A1 | 6/2011 | Stec |
| 2011/0261227 A1 | 10/2011 | Higaki |
| 2012/0206565 A1 | 8/2012 | Villmer |
| 2012/0242798 A1 | 9/2012 | Mcardle |
| 2013/0021450 A1 | 1/2013 | Yoshizawa |
| 2013/0058532 A1 | 3/2013 | White |
| 2013/0058619 A1 | 3/2013 | Miyakawa |
| 2013/0127903 A1 | 5/2013 | Paris |
| 2013/0176403 A1 | 7/2013 | Varga |
| 2013/0177168 A1 | 7/2013 | Inha |
| 2013/0182177 A1 | 7/2013 | Furlan |
| 2013/0210563 A1 | 8/2013 | Hollinger |
| 2013/0235226 A1 | 9/2013 | Karn |
| 2014/0037268 A1 | 2/2014 | Shoji |
| 2014/0039884 A1 | 2/2014 | Chen |
| 2014/0240122 A1 | 8/2014 | Roberts |
| 2015/0055937 A1 | 2/2015 | Van Hoff |
| 2015/0058102 A1 | 2/2015 | Christensen |
| 2015/0142211 A1 | 5/2015 | Shehata |
| 2015/0142742 A1 | 5/2015 | Hong |
| 2015/0166476 A1 | 6/2015 | Chen |
| 2015/0186073 A1 | 7/2015 | Pacurariu |
| 2015/0189221 A1 | 7/2015 | Nakase |
| 2015/0269714 A1* | 9/2015 | Boitard ................... G06T 5/009 382/274 |
| 2015/0287435 A1 | 10/2015 | Land |
| 2015/0288754 A1 | 10/2015 | Mosko |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0005435 A1 | 1/2016 | Campbell |
| 2016/0018822 A1 | 1/2016 | Nevdahs |
| 2016/0031559 A1 | 2/2016 | Zang |
| 2016/0054737 A1 | 2/2016 | Soll |
| 2016/0076892 A1 | 3/2016 | Zhou |
| 2016/0098469 A1 | 4/2016 | Allinson |
| 2016/0101856 A1 | 4/2016 | Kohstall |
| 2016/0112713 A1 | 4/2016 | Russell |
| 2016/0129999 A1 | 5/2016 | Mays |
| 2016/0139596 A1 | 5/2016 | Na |
| 2016/0139602 A1 | 5/2016 | Kohstall |
| 2016/0165563 A1 | 6/2016 | Jang |
| 2016/0179096 A1 | 6/2016 | Bradlow |
| 2016/0189101 A1 | 6/2016 | Kantor |
| 2016/0234438 A1 | 8/2016 | Satoh |
| 2016/0239340 A1 | 8/2016 | Chauvet |
| 2016/0269621 A1 | 9/2016 | Cho |
| 2016/0295108 A1 | 10/2016 | Cao |
| 2016/0304198 A1 | 10/2016 | Jourdan |
| 2016/0306351 A1 | 10/2016 | Fisher |
| 2016/0313734 A1 | 10/2016 | Enke |
| 2016/0327950 A1 | 11/2016 | Bachrach |
| 2016/0336020 A1 | 11/2016 | Bradlow |
| 2016/0366290 A1 | 12/2016 | Hoshino |
| 2017/0053575 A1* | 2/2017 | Ishikawa ................ G06F 3/14 |
| 2017/0061693 A1* | 3/2017 | Kohler ................ G06T 19/006 |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

PCT International Search Report for PCT/EP2014/061897 dated Sep. 15, 2014, 3 pages.

PCT International Search Report for PCT/EP2014/058008 dated May 26, 2014, 3 pages.

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Lipski, C.: "Virtual video camera", SIGGRAPH '09: Posters on, SIGGRAPH '09, vol. 0, Jan. 1, 2009 (Jan 1, 2009), pp. 1-1, XP055091257, New York, New York, USA DOI: 10.1145/1599301.1599394.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet:

(56) References Cited

OTHER PUBLICATIONS

URL:http://www.cg.cs.tu-bs.de/media/publications/eusipco2011_3d_synth.pdf [extrait le Dec. 3, 2013].

PCT International Search Report for PCT/EP2014/057352 dated Jun. 27, 2014, 3 pages.

Farin et al., "Shortest Circular Paths on Planar Graphs," in 27th Symposium on Information Theory in the Benelux 2006, 8 pgs.

Zhi et al., "Toward Dynamic Image Mosaic Generation With Robustness to Parallax," IEEE Transactions on Image Processing, vol. 21, No. 1, Jan. 2012, pp. 366-378.

Perazzi et al., "Panoramic Video from Unstructured Camera Arrays," Eurographics, vol. 34 (2015), No. 2, 12pgs.

U.S. Appl. No. 14/920,427, filed Oct. 22, 2015, entitled "Apparatus and Methods for Embedding Metadata Into Video Stream" 62 pages.

U.S. Appl. No. 14/949,786, filed Nov. 23, 2015, entitled "Apparatus and Methods for Image Alignment" 67 pages.

U.S. Appl. No. 14/927,343, filed Oct. 29, 2015, entitled "Apparatus and Methods for Rolling Shutter Compensation for Multi-Camera Systems" 45 pages.

U.S. Appl. No. 15/001,038, filed Jan. 19, 2016, entitled "Metadata Capture Apparatus and Methods" 54 pages.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

PCT International Search Report and Written Opinion for PCT/US15/38913, Sep. 29, 2015, 15 Pages.

\* cited by examiner

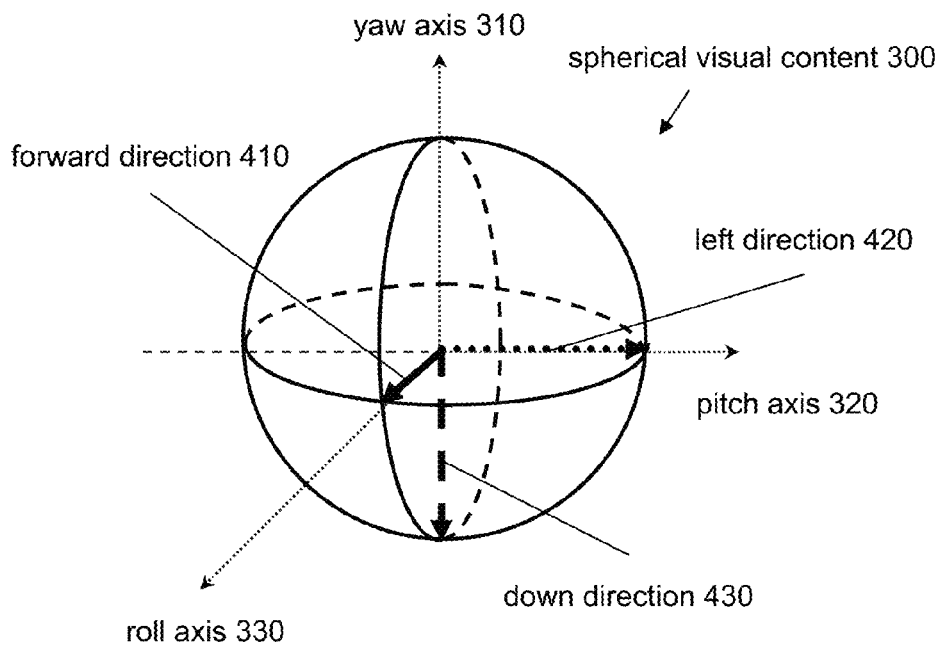
FIG. 4
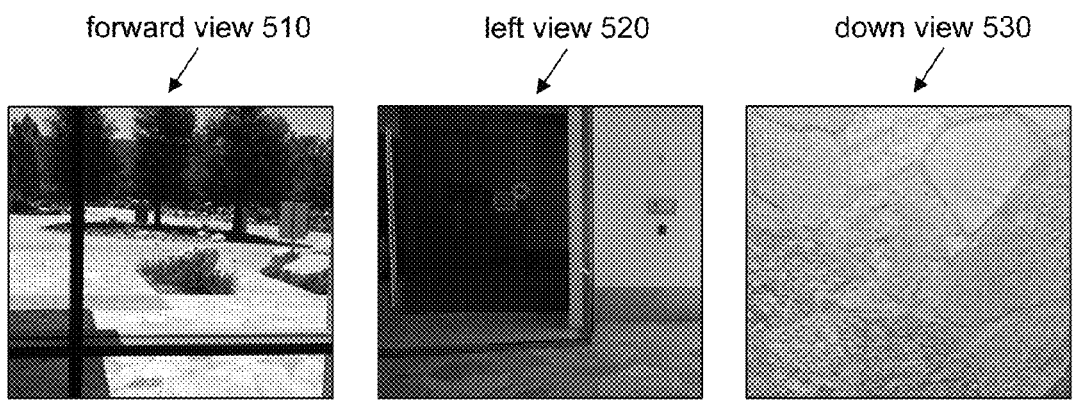
FIG. 5A  FIG. 5B  FIG. 5C viewing field of
view B 355

| Portion A1 901 | Portion A2 902 | Portion A3 903 |
| --- | --- | --- |
| 1 | 5 | 2 |
| Portion A4 904 | Portion A5 905 | Portion A6 906 |
| 1 | 4 | 6 |
| Portion A7 907 | Portion A8 908 | Portion A9 909 |
| 2 | 1 | 2 |

SYSTEMS AND METHODS FOR SIMULATING ADAPTATION OF EYES TO CHANGES IN LIGHTING CONDITIONS

FIELD

This disclosure relates to systems and methods that simulate the adaptation of eyes to changes in lighting conditions.

BACKGROUND

Image/video applications may allow a user to view a particular portion of an image/video with static exposure. Image/video applications do not apply lighting effects based on lighting conditions of a real-world scene captured within a particular portion of the image/video. The amount of lighting and details within the image/video is predetermined based on capture of the image/video and does not change based on a user's viewing of different portions of the captured image/video.

SUMMARY

This disclosure relates to simulating adaptation of eyes to changes in lighting conditions. Visual information defining visual content may be accessed. The visual content, including one or more views of real world scenes, may have been captured by one or more image sensors. The capture of visual content by image sensor(s) may define a luminance of the visual content. A viewing field of view may define an extent of the visual content presented on a display. The luminance may vary as a function of a viewing field of view. A user may change the viewing field of view from a first viewing field of view to a second viewing field. A first luminance of the visual content within the first viewing field of view and a second luminance of the visual content within the second viewing field of view may be determined. A lighting effect may be applied to the visual content based on a difference between the first luminance and the second luminance. The lighting effect may simulate the adaptation of eyes to a change in lighting conditions between the visual content within the first viewing field of view and the visual content within the second viewing field of view.

A system that simulates the adaptation of eyes to changes in lighting conditions may include one or more of a display, a processor, and/or other components. The display may include one or more devices that visually presents information. The display may be configured to present visual content within a viewing field of view. The viewing field of view may define an extent of the visual content presented on the display. Visual content may refer to media content that may be observed visually. The visual content may include one or more views of one or more real world scenes. The capture of the visual content by the image sensor(s) may define a luminance of the visual content. The luminance of the visual content may vary as a function of the viewing field of view.

The processor(s) may be configured by machine-readable instructions. Executing the machine-readable instructions may cause the processor(s) to facilitate simulating the adaptation of eyes to changes in lighting. The machine-readable instructions may include one or more computer program components. The computer program components may include one or more of a visual information component, a display component, a user input component, a luminance component, a lighting effect component, and/or other computer program components.

The visual information component may be configured to access visual information. The visual information may define the visual content. Visual content may have been captured by one or more image sensors. Visual content may have been captured at a time or at different times. Visual content may have been captured at one or more real world locations. Visual content may include one or more of an image, a sequence of images, a frame of a video, a video, and/or other visual content. Visual content may include spherical visual content. Spherical visual content may include visual content obtained by a spherical capture. Spherical visual content may include 360 degrees or less than 360 degrees capture of visual content at one or more locations.

The display component may be configured to present the visual content on the display. The extent of the visual content presented on the display may be defined by a viewing field of view and/or other information. In some implementations, the display component may present the visual content through a graphical user interface of a visual application.

The user input component may be configured to receive user input. The user input may indicate a user's selections of the viewing field of view and/or other information. The user's selections of the viewing field of view may include one or more selections of the viewing field of view at different times. The user's selections of the viewing field of view may include a selection of a first viewing field of view, a selection of a second viewing field of view, and/or other selections of the viewing field of view. The user may select the first viewing field of view at a first time. The user may select the second viewing field of view at a second time. The second time may be subsequent to the first time.

The luminance component may be configured to determine the luminance of the visual content within one or more viewing fields of view. The luminance component may determine a first luminance of the visual content within the first viewing field of view. The luminance component may determine a second luminance of the visual content within the second viewing field of view. In some implementations, the first viewing field of view may include a first portion, a second portion, and/or other portions. The first portion may be weighed differently from the second portion for the determination of the first luminance. In some implementations, the first portion may include a center portion of the first viewing field of view and the second portion may include a side portion of the first viewing field of view. The center portion may have a greater impact on the determination of the first luminance than the side portion.

The lighting effect component may be configured to apply one or more lighting effects to the visual content. The lighting effect may be determined based on a difference between the first luminance and the second luminance, and/or other information. The lighting effect may simulate the adaptation of eyes to a change in lighting conditions between the visual content within the first viewing field of view and the visual content within the second viewing field of view. In some implementations, the differences between the first luminance and second luminance may include one or more differences in a first median of the first luminance and a second median of the second luminance, a first mean of the first luminance and a second mean of the second luminance, a first range of the first luminance and a second range of the second luminance, a first maximum of the first luminance and a second maximum of the second luminance, and/or other differences between the first luminance and the second luminance.

In some implementations, the lighting effect may be applied to the visual content for one or more time durations based on the difference between the first luminance and the second luminance, and/or other information. In some implementations, the lighting effect may be applied to the visual content based on the difference between the first luminance and the second luminance meeting or exceeding a threshold.

In some implementations, the lighting effect may simulate the visual content within the second viewing field of view being overexposed based on the second luminance being higher than the second luminance. In some implementations, the lighting effect may simulate the visual content within the second viewing field of view being underexposed based on the second luminance being lower than the second luminance.

In some implementations, the lighting effect may change a brightness of the visual content within the second viewing field of view. In some implementations, the visual content within the second viewing field of view may include different portions. The change in the brightness of the visual content within the second viewing field of view may include different amounts of changes in the brightness in the different portions based on the luminance within the different portions. In some implementations, the lighting effect may change one or more tonal ranges of the visual content within the second viewing field of view.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates exemplary directions for fields of view.

FIGS. 5A-5C illustrates exemplary views within visual content.

DETAILED DESCRIPTION

Figure 1:
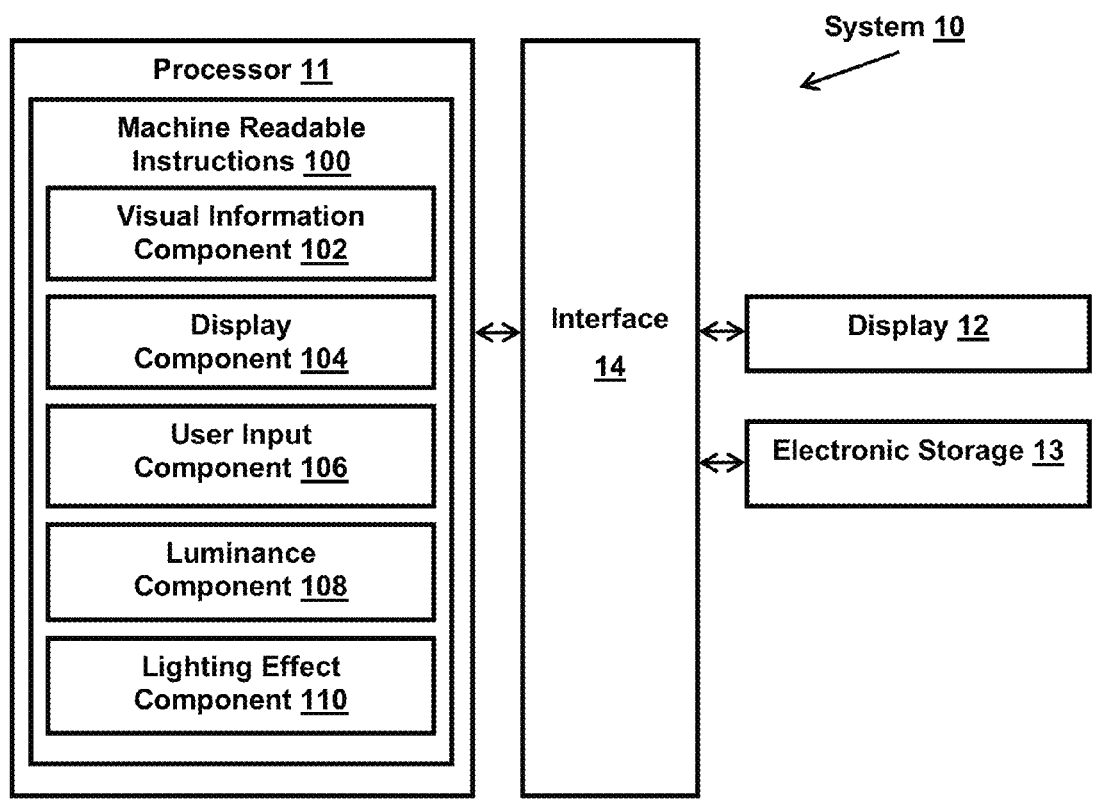
FIG. 1 illustrates a system that simulates the adaptation of eyes to changes in lighting conditions.

FIG. 1 illustrates system 10 for simulating the adaptation of eyes to changes in lighting conditions. System 10 may include one or more of processor 11, display 12, electronic storage 13, interface 14 (e.g., bus, wireless interface), and/or other components. Visual information defining visual content may be accessed by processor 11. The visual content, including one or more views of real world scenes, may have been captured by one or more image sensors. The capture of visual content by image sensor(s) may define a luminance of the visual content. A viewing field of view may define an extent of the visual content presented on a display. The luminance may vary as a function of a viewing field of view. A user may change the viewing field of view from a first viewing field of view to a second viewing field. A first luminance of the visual content within the first viewing field of view and a second luminance of the visual content within the second viewing field of view may be determined. A lighting effect may be applied to the visual content based on a difference between the first luminance and the second luminance. The lighting effect may simulate the adaptation of eyes to a change in lighting conditions between the visual content within the first viewing field of view and the visual content within the second viewing field of view.

Visual content may refer to media content that may be observed visually. The visual content may include one or more views of one or more real world scenes. Visual content may have been captured by one or more image sensors. Visual content may have been captured at a time or at different times. Visual content may have been captured at one or more real world locations. Visual content may include one or more of an image, a sequence of images, a frame of a video, a video, and/or other visual content. The capture of the visual content by the image sensor(s) may define a luminance of the visual content. Luminance may measure luminous intensities of a real world scene captured within visual content by one or more image sensors. Luminance may indicate brightness of a real world scene captured within the visual content. Luminance may describe perceived brightness of one or more colors captured within the visual content. Visual content/a portion of visual content having higher luminance may appear to be brighter than another visual content/another portion of the visual content having lower luminance.

Figure 3A:
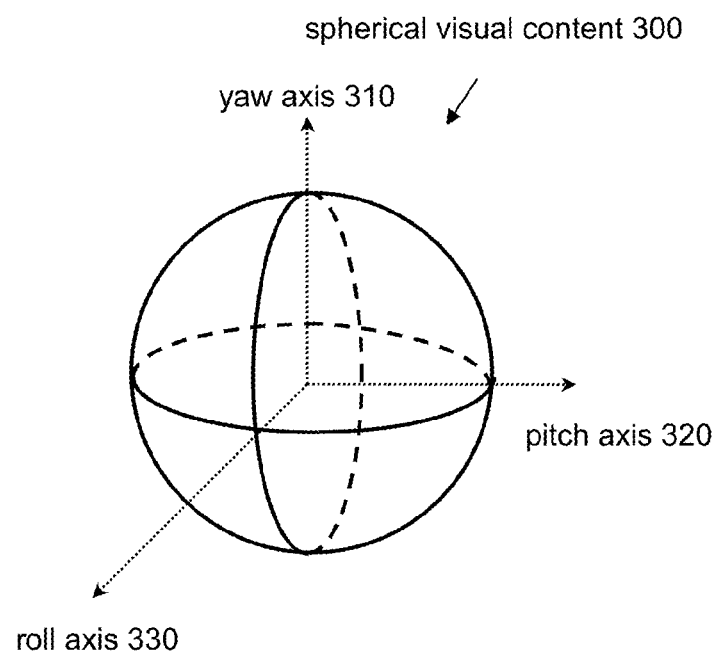
FIG. 3A illustrates an exemplary visual content.

In some implementations, visual content may include spherical visual content. FIG. 3A illustrates an exemplary spherical visual content 300. Spherical visual content 300 may include visual content obtained by a spherical capture. Spherical visual content 300 may include 360 degrees or less than 360 degrees capture of visual content at one or more locations. Spherical visual content 300 may include views of real world scenes from one or more locations at one or more times. For example, spherical visual content 300 may include views of one or more real world scenes located inside a building at a particular time or particular times. Visual content including other views of other real world scenes are contemplated.

Figure 3B:
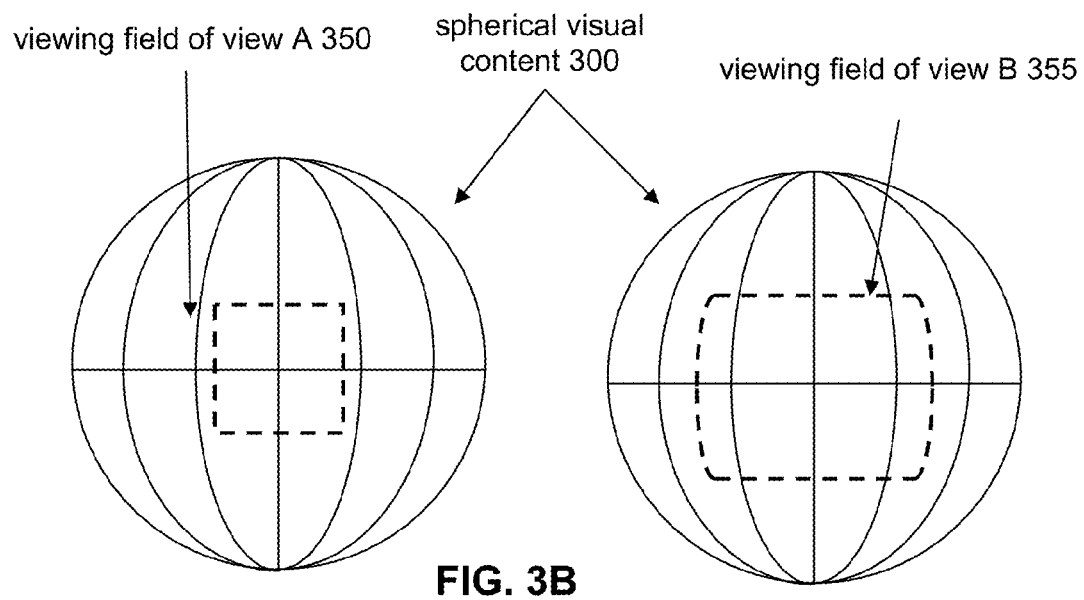
FIG. 3B illustrates exemplary fields of view for visual content.

Display 12 may include one or more devices that visually presents information. In some implementations, the display may include one or more of a head-mounted display, a see-through display, a visor, eyeglasses, sunglasses, a smartphone, a tablet, a mobile device, a monitor, a projector, and/or other displays. Display 12 may be configured to present visual content within a viewing field of view. A viewing field of view may define an extent of the visual content presented on display 12. For example, FIG. 3B illustrates exemplary viewing field of view A 350 and viewing field of view B 355 for spherical visual content 300. Viewing field of view A 350 may be smaller than viewing field of view B 355. Presentation of spherical visual content 300 within viewing field of view A 350 on display 12 may include a smaller portion of spherical visual content 300 than presentation of spherical visual content 300 within viewing field of view B 355 on display 12.

The luminance of the visual content may vary as a function of the viewing field of view. For example, FIG. 4 illustrates exemplary directions for different fields of view. Spherical visual content 300 within a viewing field of view directed in forward direction 410, aligned with positive roll axis 300, may be characterized by different luminance than spherical visual content 300 within a different viewing field of view directed in another direction (e.g., left direction 420, aligned with positive pitch axis 320; down direction 430, aligned with negative yaw axis 310).

FIGS. 5A-5C illustrates exemplary views within spherical visual content 300. Forward view 510 may include spherical visual content 300 within a viewing field of view directed in forward direction 410. Left view 520 may include spherical visual content 300 within a viewing field of view directed in left direction 420. Down view 530 may include spherical visual content 300 within a viewing field of view directed in down direction 430. Luminance of forward view 510 may be higher than luminance of left view 520 and luminance of down view 530. Luminance of down view 530 may be higher than luminance of left view 520.

Electronic storage 13 may be configured to include electronic storage medium that electronically stores information. Electronic storage 13 may store software algorithms, information determined by processor 11, information received remotely, and/or other information that enables system 10 to function properly. For example, electronic storage 13 may store information relating to visual content, luminance of the visual content, viewing fields of view, lighting effects, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate simulating the adaptation of eyes to changes in lighting conditions. Machine readable instructions 100 may include one or more computer program components. Machine readable instructions 100 may include one or more of visual information component 102, display component 104, user input component 106, luminance component 108, lighting effect component 110, and/or other computer program components.

Visual information component 102 may be configured to access visual information. The visual information may define one or more visual content. Visual information component 102 may access one or more visual information from one or more storage locations. A storage location may include electronic storage 13, electronic storage of one or more image sensors (not shown in FIG. 1), and/or other locations. Visual information component 102 may be configured to access visual information defining one or more visual content during acquisition of the visual information and/or after acquisition of the visual information by one or more image sensors. For example, visual information component 102 may access visual information defining a video while the video is being captured by one or more image sensors. Visual information component 102 may access visual information defining a video after the video has been captured and stored in memory (e.g., electronic storage 13).

Display component 104 may be configured to present the visual content on display 12. The extent of the visual content presented on display 12 may be defined by a viewing field of view and/or other information. For example, display component 104 may present forward view 510 on display 12 based on a user having selected a viewing field of view directed in forward direction 410. Display component 104 may present left view 520 on display 12 based on a user having selected a viewing field of view directed in left direction 420. Display component 104 may present down view 530 on display 12 based on a user having selected a viewing field of view directed in down direction 430. Other presentation of the visual content on display 12 are contemplated.

In some implementations, display component 104 may present the visual content through a user interface of a visual application. A visual application may refer to one or more software, one or more software running on one or more hardware (e.g., a mobile device, a desktop device, a camera), and/or other applications operating to present visual content on display 12. As a non-limiting example, a visual application may include one or more of visual content viewer, visual content editor, and/or other visual application.

A user interface may refer to a graphical user interface that allows a user to interact with the visual application. The user interface may appear upon interaction with the visual application by the user. The user interface may disappear if there is no interaction with the visual application over a duration of time. The graphical user interface may include one or more buttons/selections (e.g., rewind button, pause button, play button, fast-forward button, zoom button, swivel button) for controlling the presentation of the visual content on display 12.

User input component 106 may be configured to receive user input. The user input may indicate a user's selections of the viewing field of view and/or other information. The user's selections of the viewing field of view may include one or more selections of the viewing field of view at different times. For example, a user may initially select a viewing field of view directed in forward direction 410. The user may later change the selection of the viewing field of view to a viewing field of view directed in left direction 420. Other selections of the viewing field of view and changes in selections of viewing field of view are contemplated. In some implementations, user input component 106 may receive user input based on movements of a user's head (e.g., a user is using a head-mounted display and can change the selection of the viewing field of view by moving/rotating the head). In some implementations, user input component 106 may receive user input based on a user's interaction with buttons (e.g., keyboard, virtual buttons), mouse, touchscreen display, joystick, and/or other user-input devices.

Luminance component 108 may be configured to determine the luminance of the visual content within one or more viewing fields of view. For example, luminance component 108 may determine luminance of forward view 510, left view 520, down view 530, and/or other views of spherical visual content 300. Luminance may vary within the visual content. For example, luminance of forward view 510 may be higher than luminance of left view 520 and luminance of down view 530. Luminance of down view 530 may be higher than luminance of left view 520.

Luminance of the visual content may be defined by the capture of the visual content by one or more image sensor(s). Luminance determined by luminance component 108 may refer to actual luminance of the visual content or other metric that is related to or derived at least in part from the actual luminance of the visual content. Luminance component 108 may determine luminance of the visual content based on analysis of the visual content, analysis of information regarding capture of the visual content, and/or other information. For example, luminance component 108 may determine the luminance of visual content within different viewing fields of view based on analysis of the extent of the visual content presented on display 12 (e.g., forward view 510, left view 520, down view 530), and/or other information.

Luminance component 108 may determine the luminance of visual content within different viewing fields of view based on analysis of information regarding capture of the visual content (e.g., exposure triangle setting of the image sensor(s) for the relevant field of view at the time of capture, exposure meter/light metering for the relevant field of view at the time of capture, exposure compensation for the relevant field of view at the time of capture) that indicates luminance of the extent of the visual content presented on display 12. Luminance component 108 may determine the luminance of visual content within different viewing fields of view based on analysis of the extent of the visual content presented on display 12 and information regarding capture of the visual content that indicates luminance of the extent of the visual content presented on display 12, Other methods of determining luminance of the visual content within different fields of view are contemplated.

Luminance of the visual content may not be defined by generation of virtual visual content. Virtual visual content may refer to visual content generated by a computer and including a view of a virtual world scene. For example, a graphics engine running on a computer may generate virtual visual content including a view of a virtual world scene. Luminance of the virtual visual content within a viewing field of view may be determine based on the generation of the virtual visual content by the graphic engine. Luminance component 108 may not determine the luminance of the visual content within one or more viewing fields of view based on the generation of virtual visual content by a computer.

Figure 9:
FIG. 9 illustrates exemplary portions within a viewing field of view.

In some implementations, a viewing field of view may include multiple portions. For example, as shown in FIG. 9, viewing field of view B 355 may include portion A1 901, portion A2 902, portion A3 903, portion A4 904, portion A5 905, portion A6 906, portion A7 907, portion A8 908, portion A9 909, and/or other portions. Values within different portions 901-909 may represent amount of luminance within the different portions.

One or more portions 901-909 of viewing field of view B 355 may be weighed differently from other portions for the determination of luminance of visual content within viewing field of view B 355. For example, portion A5 905 may include a center portion of viewing field of view B 355 and portion A6 may include a side portion of viewing field of view B 355. Portion A5 905 may have a greater impact on the determination of luminance of visual content within viewing field of view B 355 than portion A6 906. For example, luminance of portion A5 905 may be characterized with value "4" and luminance of portion A6 906 may be characterized with value "6." Value "4" of portion A5 905 may have a greater impact on the determination of luminance of visual content within viewing field of view B 355 than value "6" of portion A6 906.

Weighing different portions of a viewing field of view differently for luminance determination may allow for luminance component 108 to prioritize different portions of a viewing field of view for luminance determination. For example, luminance component 108 may prioritize a center portion of a viewing field of view over other portions of a viewing field of view for luminance determination. Other prioritizations of portions of a viewing field of view for luminance determination are contemplated.

In some implementations, one or more parts of viewing field of view may be weighed based on the portion(s) of the color spectrum present in the portions. For example, in high light conditions, human eyes may be more sensitive to yellow than blue. Yellow light may be perceived to be brighter than blue light of equal intensity. For visual content of high light conditions, luminance component 108 may weigh parts containing the color spectrum corresponding to yellow more than parts containing the color spectrum corresponding to blue for luminance determination. In some implementations, luminance component 108 may determine luminance based on one or more color spectrums (e.g., yellow in high light conditions) and may disregard one or more other color spectrums (e.g., blue in high light conditions) based on sensitivity of human eyes to different color spectrums.

In some implementations, luminance component 108 may prioritize a portion of a viewing field of view based on a gaze of a user. For example, luminance component 108 may determine that within viewing field of view B 355, a user's eyes are focused on portion A9 909. In response, portion A9 909 may have a greater impact on the determination of luminance of visual content within viewing field of view B 355 than other portions. Weighing a portion of the viewing field of view based on a gaze of a user may allow for luminance component 108 to determine luminance such that the triggering of the lighting effect is based on the gaze of the user on the visual content.

Lighting effect component 110 may be configured to apply one or more lighting effects to the visual content. A lighting effect may simulate the adaptation of eyes to a change in lighting conditions between the visual content within different viewing fields of view. For example, a lighting effect may simulate the adaptation of eyes to a change in lighting conditions between the visual content within a first viewing field of view selected by a user and a second viewing field of view selected by the user.

The lighting effect may simulate the visual content within the second viewing field of view being overexposed based on the luminance of the visual content within the second viewing field of view being higher than the luminance of the visual content within the first viewing field of view. Simulating overexposure of the visual content may simulate adaptation of eyes to lighting conditions changing from a darker lighting condition to a brighter lighting condition. Simulating overexposure of the visual content within a viewing field of view may increase the brightness of one or more portions of the visual content within the viewing field of view and may reduce the amount of details (e.g., highlight detail) of the visual content within the viewing field of view.

Figure 6:
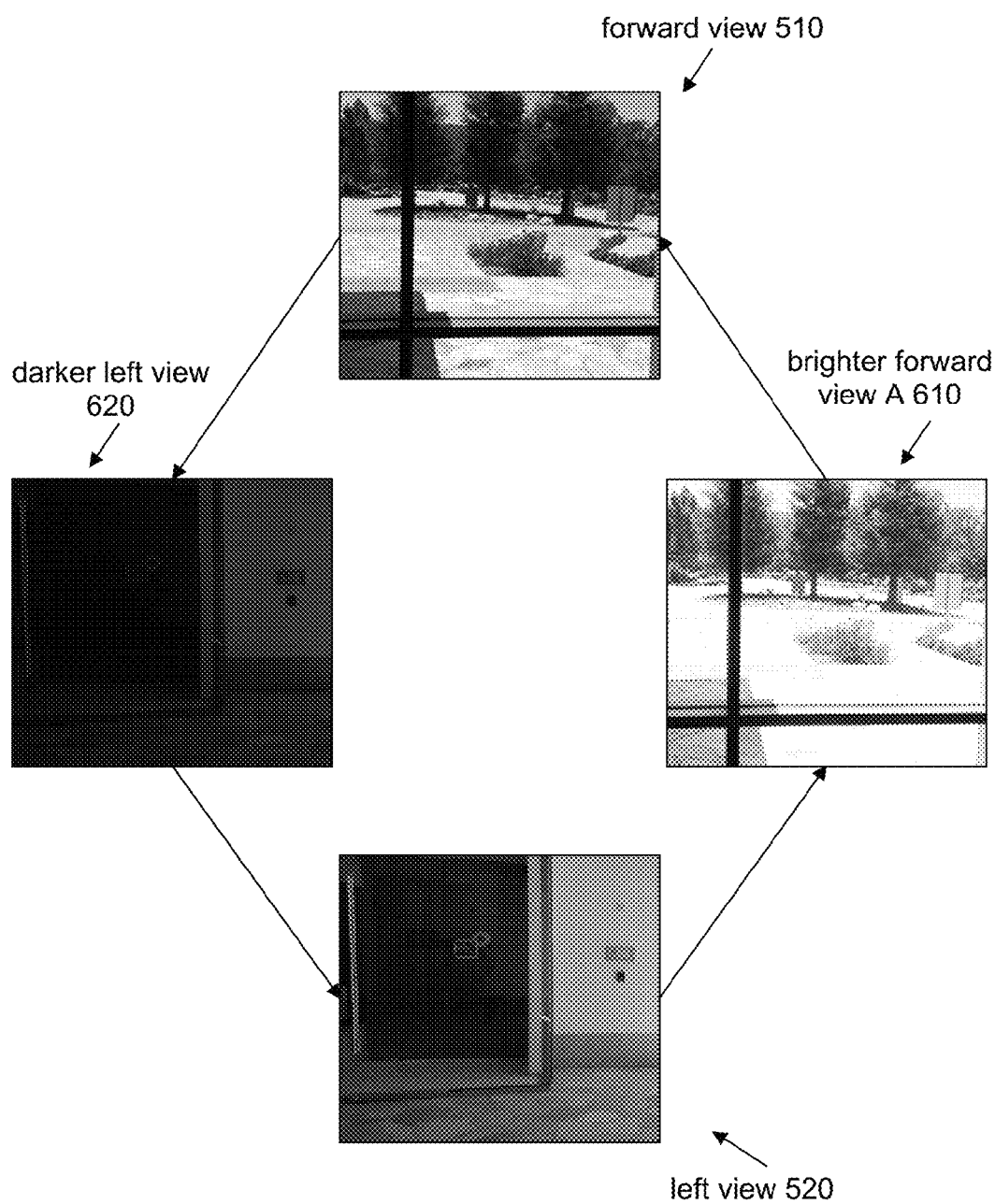
FIGS. 6-7 illustrate exemplary lighting effects that simulates the adaptation of eyes to changes in lighting conditions.
Figure 7:
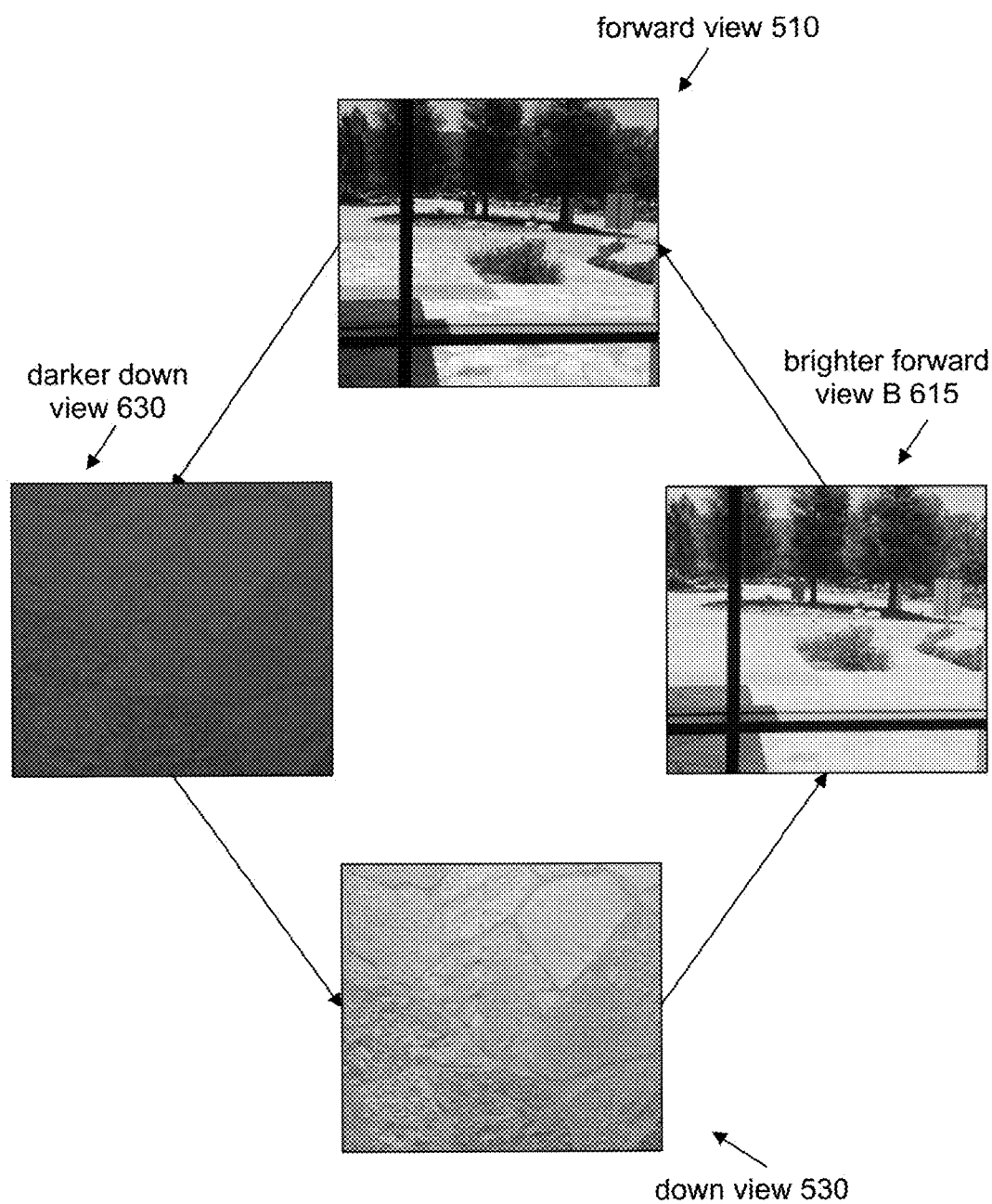

FIGS. 6-7 illustrate exemplary lighting effects that simulate the adaptation of eyes to changes in lighting conditions. In FIG. 6, luminance of forward view 510 may be higher than luminance of left view 520. A user may change the viewing field of view to change the visual content presented on display 12 from left view 520 to forward view 510. Based on the luminance of forward view 510 being higher than the luminance of left view 520, lighting effect component 110 may apply a lighting effect that simulates the forward view 510 being overexposed. When the user changes the viewing field of view from looking at left view 520 to forward view 510, the lighting effect may cause display 12 to present brighter forward view A 610. Display 12 may present brighter forward view A 610 for a duration before displaying forward view 510. The lighting effect may change over time so that display 12 initially presents brighter forward view A 610 and gradually changes to present forward view 510.

The lighting effect may simulate the visual content within the second viewing field of view being underexposed based on the luminance of the visual content within the second viewing field of view being lower than the luminance of the visual content within the first viewing field of view. Simulating underexposure of the visual content may simulate adaptation of eyes to lighting conditions changing from a brighter lighting condition to a darker lighting condition. Simulating underexposure of the visual content within a viewing field of view may decrease the brightness of one or more portions of the visual content within the viewing field of view and may reduce the amount of details (e.g., shadow detail) of the visual content within the viewing field of view.

In FIG. 6, luminance of left view 520 may be lower than luminance of forward view 510. A user may change the viewing field of view to change the visual content presented on display 12 from forward view 510 to left view 520. Based on the luminance of left view 520 being lower than the luminance of forward view 510, lighting effect component 110 may apply a lighting effect that simulates the left view 520 being underexposed. When the user changes the viewing field of view from looking at forward view 510 to left view 520, the lighting effect may cause display 12 to present darker left view 620. Display 12 may present darker left view 620 for a duration before displaying left view 520. The lighting effect may change over time so that display 12 initially presents darker left view 620 and gradually changes to present left view 520.

The lighting effect may change a brightness of the visual content within the second viewing field of view based on the difference between the luminance of the visual content within the first viewing field of view and the luminance of the visual content within the second viewing field of view. The lighting effect may increase the brightness of one or more portions of the visual content within the second viewing field of view based on the luminance of the visual content within the second viewing field of view being higher than the luminance of the visual content within the first viewing field of view. The lighting effect may decrease the brightness of one or more portions of the visual content within the second viewing field of view based on the luminance of the visual content within the second viewing field of view being lower than the luminance of the visual content within the first viewing field of view.

In some implementations, the visual content within a viewing field of view may include different portions. The change(s) in the brightness of the visual content within a viewing field of view may include different amounts of changes in the brightness in the different portions based on the luminance within the different portions. The brighter portions within the visual content within the viewing field of view may be brightened more than the darker portions within the visual content. The darker portions within the visual content within the viewing field of view may be darkened more than the brighter portions within the visual content.

In some implementations, the lighting effect may change one or more tonal ranges of the visual content within a viewing field of view. Changing the width and/or location of tonal ranges may change the contrast of highlight and/or shadow areas of visual content within a viewing field of view. For example, reducing the width of the tonal range may reduce the contrast of the visual content within the viewing field of view. Increasing the width of the tonal range may increase the contrast of the visual content within the viewing field of view. Changing the contrast of the visual content within a viewing field of view may change the amount of details of the visual content within the viewing field of view. The lighting effect may change the tonal range of the visual content within the viewing field of view to change the amount of details of the visual content within the viewing field of view. Other changes of visual content within a viewing field of view are contemplated.

The lighting effects to be applied may be determined based on a difference between the luminance of the first viewing field of view selected by a user and the luminance of the second viewing field of view selected by the user, and/or other information. In some implementations, the differences between two or more luminance may include one or more differences in a median of the luminance, a mean of the luminance, a range of the luminance, a maximum of the luminance, and/or other differences between the luminance.

The amount of lighting effect (e.g., the degree to which the lighting effect changes the brightness, exposure, tonal ranges of the visual content) may be determined based on the amount of difference between the luminance of visual content within different viewing fields of view. For example, larger differences between the luminance of visual content within different viewing fields of view may lead to larger amounts of lighting effect (e.g., larger changes in brightness, exposure, tonal ranges of the visual content) and smaller differences between the luminance of visual content within different viewing fields of view may lead to smaller amounts of lighting effect (e.g., smaller changes in brightness, exposure, tonal ranges of the visual content).

For example, referring to FIG. 7, a user may change the viewing field of view to change the visual content presented on display 12 from down view 530 to forward view 510. Based on the luminance of forward view 510 being higher than the luminance of down view 530, lighting effect component 110 may apply a lighting effect that simulates the forward view 510 being overexposed. When the user changes the viewing field of view from looking at down view 530 to forward view 510, the lighting effect may cause display 12 to present brighter forward view B 615. Display 12 may present brighter forward view B 615 for a duration before displaying forward view 510. The lighting effect may change over time so that display 12 initially presents brighter forward view B 615 and gradually changes to presenting forward view 510.

Luminance of down view 530 may be higher than luminance of left view 520 (shown in FIG. 6). The difference between the luminance of forward view 510 and down view 530 may be smaller than the difference between the luminance of forward view 510 and left view 520. The amount of lighting effect applied by lighting effect component 110 when a user changes the viewing field of view to change the visual content presented on display 12 from down view 530 to forward view 510 may be smaller than the amount of lighting effect applied by lighting effect component 110 when a user changes the viewing field of view to change the visual content presented on display 12 from left view 520 to forward view 510. For example, based on the difference between the luminance of forward view 510 and down view 530 being smaller than the difference between the luminance of forward view 510 and left view 520, brighter forward view B 615 may not be as bright as brighter forward view A 610.

In some implementations, the lighting effect may be applied to the visual content for one or more time durations based on the difference between the luminance of visual content within different viewing fields of view, and/or other information. For example, larger differences between the luminance of visual content within different viewing fields of view may lead to the lighting effect being applied for a longer duration and smaller differences between the luminance of visual content within different viewing fields of view may lead to the lighting effect being applied for a shorter duration. The effect of the lighting effect on the visual content may gradually change over the effective time duration.

Figure 8:
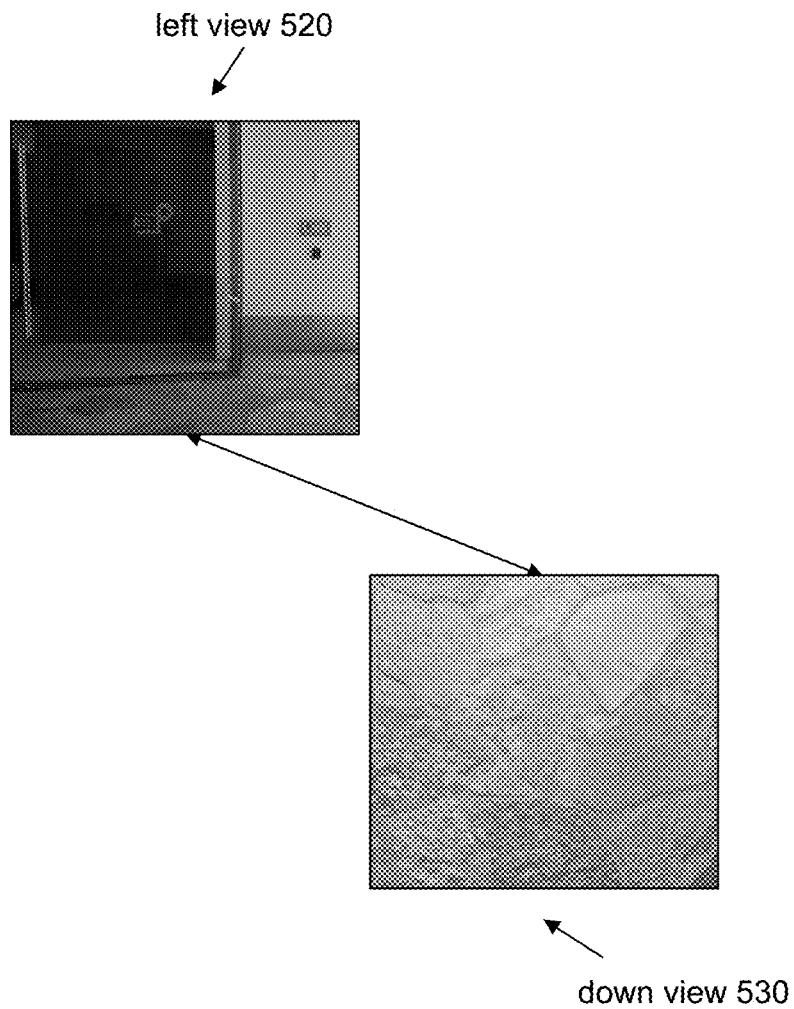
FIG. 8 illustrates exemplary changes in viewing field of view with no lighting effects.

In some implementations, the lighting effect may be applied to the visual content based on the difference between the luminance of the first viewing field of view selected by a user and the luminance of the second viewing field of view selected by the user meeting or exceeding a threshold. Small differences between the luminance of different viewing fields of view that does not meet the threshold may not trigger a lighting effect. For example, as shown in FIG. 8, the luminance of left view 520 and the luminance of down view 530 may not be large enough to trigger the application of lighting effect by lighting effect component 110. A user changing the viewing field of view to change the presentation of visual content presented on display 12 from left view 520 to down view 530, or vice versa, may not see the lighting effect. No intermediate views of left view 520 or down view 530 (e.g., brighter left view, darker left view, brighter down view, darker down view) may be presented on display 12 when the user changes the viewing field of view between left view 520 and down view 530.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11, display 12, and electronic storage 13 are shown to be connected to interface 14 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 13 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 13 may be a separate component within system 10, or electronic storage 13 may be provided integrally with one or more other components of system 10 (e.g., processor 11). Although electronic storage 13 is shown in FIG. 1 as a single entity, this is for illustrative purposes only. In some implementations, electronic storage 13 may comprise a plurality of storage units. These storage units may be physically located within the same device, or electronic storage 13 may represent storage functionality of a plurality of devices operating in coordination.

Figure 2:
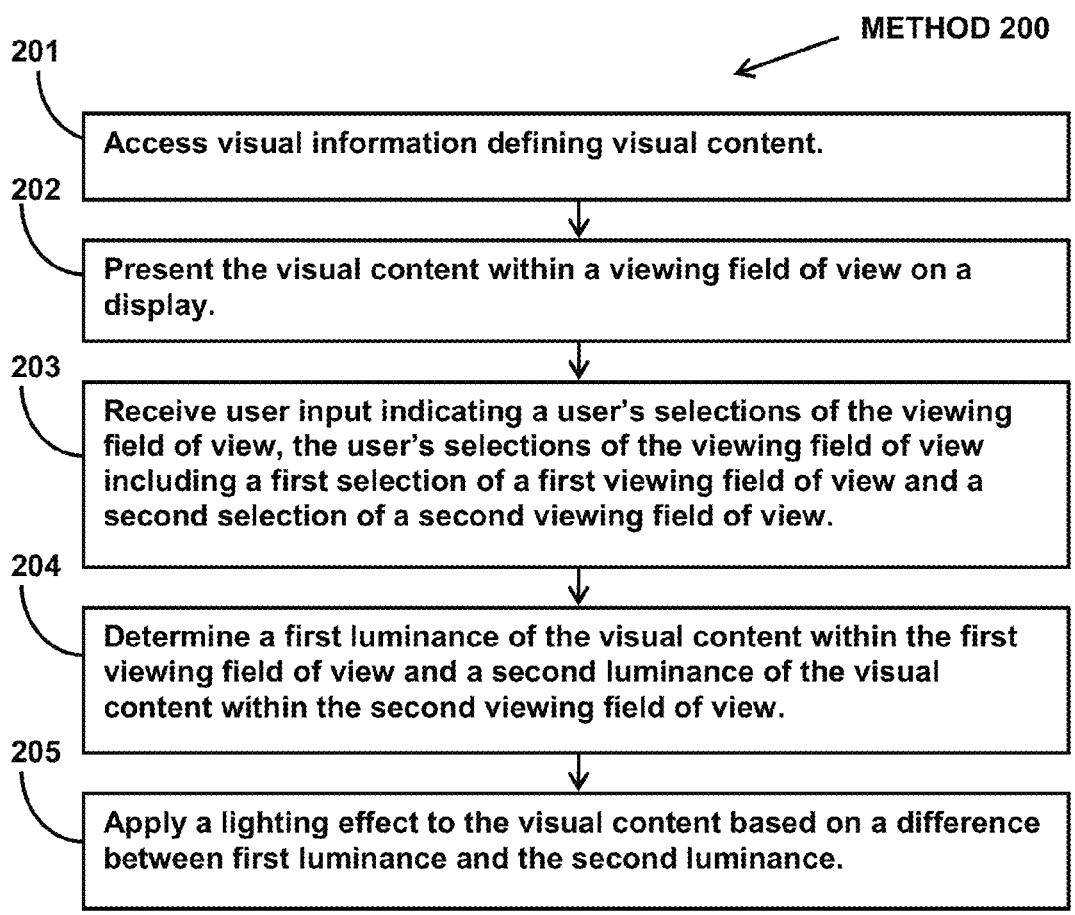
FIG. 2 illustrates a method for simulating the adaptation of eyes to changes in lighting conditions.

FIG. 2 illustrates method 200 for simulating adaptation of eyes to changes in lighting conditions. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, visual information defining visual content may be accessed. The visual content may have been captured by one or more image sensors and may include one or more views of one or more real world scenes. The capture of the visual content by the image sensor(s) may define a luminance of the visual content. The luminance may vary as a function of a viewing field of view. The viewing field of view may define an extent of the visual content presented on a display. In some implementation, operation 201 may be performed by a processor component the same as or similar to visual information component 102 (Shown in FIG. 1 and described herein).

At operation 202, the visual content within a viewing field of view may be presented on a display. In some implementations, operation 202 may be performed by a processor component the same as or similar to display component 104 (Shown in FIG. 1 and described herein).

At operation 203, user input indicating a user's selections of the viewing field of view may be received. The user's selections of the viewing field of view may include a first selection of a first viewing field of view at a first time, and a second selection of a second viewing field of view at a second time. The second time may be subsequent to the first time. In some implementations, operation 203 may be performed by a processor component the same as or similar to user input component 106 (Shown in FIG. 1 and described herein).

At operation 204, a first luminance of the visual content within the first viewing field of view and a second luminance of the visual content within the second viewing field of view may be determined. In some implementations, operation 204 may be performed by a processor component the same as or similar to luminance component 108 (Shown in FIG. 1 and described herein).

At operation 205, a lighting effect may be applied based on a difference between the first luminance and the second luminance. The lighting effect may simulate the adaptation of eyes to a change in lighting conditions between the visual content within the first viewing field of view and the visual content within the second viewing field of view. In some implementations, operation 205 may be performed by a processor component the same as or similar to lighting effect component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating adaptation of eyes to changes in lighting conditions, the system comprising:
a display configured to present visual content within a viewing field of view, the viewing field of view defining an extent of the visual content presented on the display, the visual content captured by one or more image sensors and including a view of a real world scene, the capture of the visual content by the one or more image sensors defining a luminance of the visual content, the luminance varying as a function of the viewing field of view; and
one or more physical processors configured by machine-readable instructions to:
access visual information defining the visual content;
present the visual content on the display;
receive user input indicating a user's selections of the viewing field of view, the user's selections of the viewing field of view including a first selection of a first viewing field of view at a first time and a second selection of a second viewing field of view at a second time that is subsequent to the first time;
determine a first luminance of the visual content within the first viewing field of view;
determine a second luminance of the visual content within the second viewing field of view;
apply a lighting effect to the visual content based on a difference between the first luminance and the second luminance, the lighting effect simulating the adaptation of eyes to a change in lighting conditions between the visual content within the first viewing field of view and the visual content within the second viewing field of view.

2. The system of claim 1, wherein the difference between the first luminance and the second luminance includes one or more differences in a first median of the first luminance and a second median of the second luminance, a first mean of the first luminance and a second mean of the second luminance, a first range of the first luminance and a second range of the second luminance, and/or a first maximum of the first luminance and a second maximum of the second luminance.

3. The system of claim 1, wherein the first viewing field of view includes a first portion and a second portion, the first portion weighed differently from the second portion for the determination of the first luminance.

4. The system of claim 3, wherein the first portion includes a center portion of the first viewing field of view and the second portion includes a side portion of the first viewing field of view, the center portion having a greater impact on the determination of the first luminance than the side portion.

5. The system of claim 1, wherein the lighting effect is applied to the visual content for a time duration based on the difference between the first luminance and the second luminance.

6. The system of claim 1, wherein the lighting effect is applied to the visual content based on the difference between the first luminance and the second luminance meeting or exceeding a threshold.

7. The system of claim 1, wherein the lighting effect simulates the visual content within the second viewing field of view being overexposed based on the second luminance being higher than the first luminance and being underexposed based on the second luminance being lower than the first luminance.

8. The system of claim 1, wherein the lighting effect changes a brightness of the visual content within the second viewing field of view.

9. The system of claim 8, wherein the visual content within the second viewing field of view includes different portions and the change in the brightness of the visual content within the second viewing field of view includes different amounts of changes in the brightness in the different portions based on the luminance within the different portions.

10. The system of 1, wherein the lighting effect changes one or more tonal ranges of the visual content within the second viewing field of view.

11. A method for simulating adaptation of eyes to changes in lighting conditions, the method comprising:
   accessing visual information defining visual content, the visual content captured by one or more image sensors and including a view of a real world scene, the capture of the visual content by the one or more image sensors defining a luminance of the visual content, the luminance varying as a function of a viewing field of view, the viewing field of view defining an extent of the visual content presented on a display;
   presenting the visual content within the viewing field of view on the display;
   receiving user input indicating a user's selections of the viewing field of view, the user's selections of the viewing field of view including a first selection of a first viewing field of view at a first time and a second selection of a second viewing field of view at a second time that is subsequent to the first time;
   determining a first luminance of the visual content within the first viewing field of view;
   determining a second luminance of the visual content within the second viewing field of view;
   applying a lighting effect to the visual content based on a difference between the first luminance and the second luminance, the lighting effect simulating the adaptation of eyes to a change in lighting conditions between the visual content within the first viewing field of view and the visual content within the second viewing field of view.

12. The method of claim 11, wherein the difference between the first luminance and the second luminance includes one or more differences in a first median of the first luminance and a second median of the second luminance, a first mean of the first luminance and a second mean of the second luminance, a first range of the first luminance and a second range of the second luminance, and/or a first maximum of the first luminance and a second maximum of the second luminance.

13. The method of claim 12, wherein the first viewing field of view includes a first portion and a second portion, the first portion weighed differently from the second portion for the determination of the first luminance.

14. The method of claim 13, wherein the first portion includes a center portion of the first viewing field of view and the second portion includes a side portion of the first viewing field of view, the center portion having a greater impact on the determination of the first luminance than the side portion.

15. The method of claim 11, wherein the lighting effect is applied to the visual content for a time duration based on the difference between the first luminance and the second luminance.

16. The method of claim 11, wherein the lighting effect is applied to the visual content based on the difference between the first luminance and the second luminance meeting or exceeding a threshold.

17. The method of claim 11, wherein the lighting effect simulates the visual content within the second viewing field of view being overexposed based on the second luminance being higher than the first luminance and being underexposed based on the second luminance being lower than the first luminance.

18. The method of claim 11, wherein the lighting effect changes a brightness of the visual content within the second viewing field of view.

19. The method of claim 18, wherein the visual content within the second viewing field of view includes different portions and the change in the brightness of the visual content within the second viewing field of view includes different amounts of changes in the brightness in the different portions based on the luminance within the different portions.

20. The method of 11, wherein the lighting effect changes one or more tonal ranges of the visual content within the second viewing field of view.

* * * * *